Oct. 20, 1931.  G. W. MÜLLER  1,828,573

ELECTRICAL APPARATUS

Filed Nov. 6, 1928

Inventor:
Gustav W. Müller,
by Charles E. Muller
His Attorney.

Patented Oct. 20, 1931

1,828,573

UNITED STATES PATENT OFFICE

GUSTAV W. MÜLLER, OF BERLIN-CHARLOTTENBURG, GERMANY, ASSIGNOR TO GENERAL ELECTRIC COMPANY, A CORPORATION OF NEW YORK

ELECTRICAL APPARATUS

Application filed November 6, 1928, Serial No. 317,644, and in Germany February 25, 1928.

My invention relates to electrical apparatus for transmitting power between alternating and direct current circuits and has for its principal object the provision of an improved means for regulating an electrical condition such as the voltage of the direct current circuit.

In apparatus including mercury arc rectifiers or the like it is desirable to provide induction coils in series with the direct current circuit to smooth out the potential ripples which are produced in such circuits and to prevent the rise in direct current voltage which tends to occur at light loads. The amount of inductance required to give the desired effect is dependent upon the number of phases in the alternating current source and becomes greatest in single phase rectifying systems.

The inductance coils should include a conductor whose cross section is sufficient to carry the maximum current and should contain enough turns to have the necessary inductance at small currents. In railway systems which are often operated on single phase current having a frequency as low as 16⅔ cycles per second, these coils become objectionably large and expensive.

In accordance with my invention this difficulty is avoided by the provision of a plurality of induction coils designed to carry successively smaller currents and arranged to be successively short-circuited as the current in the circuit increases.

My invention will be better understood from the following description when considered in connection with the accompanying drawings and its scope will be pointed out in the appended claims.

Figure 1:
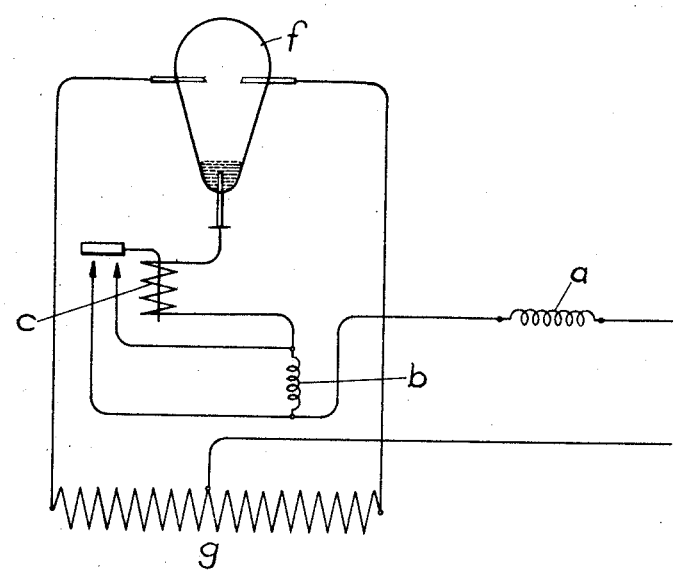
Figure 2:
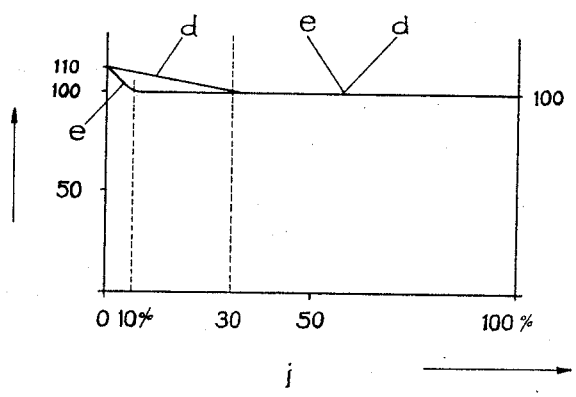

Referring to the drawings, I have illustrated in Fig. 1 an apparatus and a system of connection therefor incorporating my invention, and in Fig. 2 the relation between load current and potential in a system according to Fig. 1.

Fig. 1 illustrates a rectifier $f$, the anodes of which are connected to a transformer winding $g$, which has its mid-point connected to one side of the direct current circuit. The cathode of the rectifier $f$ is connected in series with two inductance coils $a$ and $b$. The coil $a$ is permanently connected in the circuit and is preferably designed to give sufficient smoothing effect down to about 30% of full load current. The coil $b$ is preferably designed to carry current only up to about 30% of full load current and is wound to produce sufficient smoothing and regulating effect down to about 10% of full load. A relay $c$ is arranged to short-circuit the coil $b$ at about 30% of full load current.

Fig. 2 illustrates the relation between the direct current voltage and the load current. The direct current potential, when only the coil $a$ is in circuit, is shown by the curve $d$ and the value of this potential curve when both coils $a$ and $b$ are used is shown by the curve $e$. It is evident from these curves that this arrangement is practical for loads down to about 10% of full load. Should the load current of the rectifier occasionally drop below this value, it is desirable either to provide a further induction coil or to provide a load resistance which may be temporarily connected across the rectifier to maintain the total current above 10% of full load.

It is of course evident that more than two coils may be used having successively decreased copper cross sections and correspondingly increased numbers of turns. In systems subjected to widely varying loads, a substantial saving in copper is made possible by my invention because the heavy current coils can be considerably reduced and the additional low current coils offset only a small percentage of this saving.

What I claim as new and desire to secure by Letters Patent of the United States is:

1. The combination of alternating and direct current terminals, a mercury arc rectifier connected to transmit power between said terminals, inductance coils connected in series with said direct current terminals, and means for short-circuiting a part of said coils when the current flowing therein exceeds a predetermined percentage of the full load current between said direct current terminals, said part of said coils being capable of carrying only said percentage of said full load current.

2. In combination, alternating current terminals and a direct current circuit, a mercury arc rectifier connected to transmit power between said terminals and said circuit, two inductance coils connected in series with said circuit, one of said coils being capable of carrying the full load current in said circuit and the other of said coils being capable of carrying only a predetermined percentage thereof, and means for short-circuiting said other coil when the load current exceeds said predetermined percentage.

3. In combination, alternating current terminals, a direct current circuit, a mercury arc rectifier connected to transmit power between said terminals and said circuit, means for regulating the voltage of said direct current circuit including inductance coils connected in series with said circuit, said coils being so proportioned that one coil is capable of carrying full load current and has sufficient inductance to give the desired regulation and the other of said coils having smaller current capacity and correspondingly greater inductance, and means for short-circuiting said other coil when the current in said circuit exceeds the capacity thereof.

In witness whereof, I have hereunto set my hand this 19th day of October, 1928.

GUSTAV W. MÜLLER.